P. SMAGEL.
FISH SEINE OR NET.
APPLICATION FILED SEPT. 17, 1914.
1,128,376.
Patented Feb. 16, 1915.
Fig. 1.
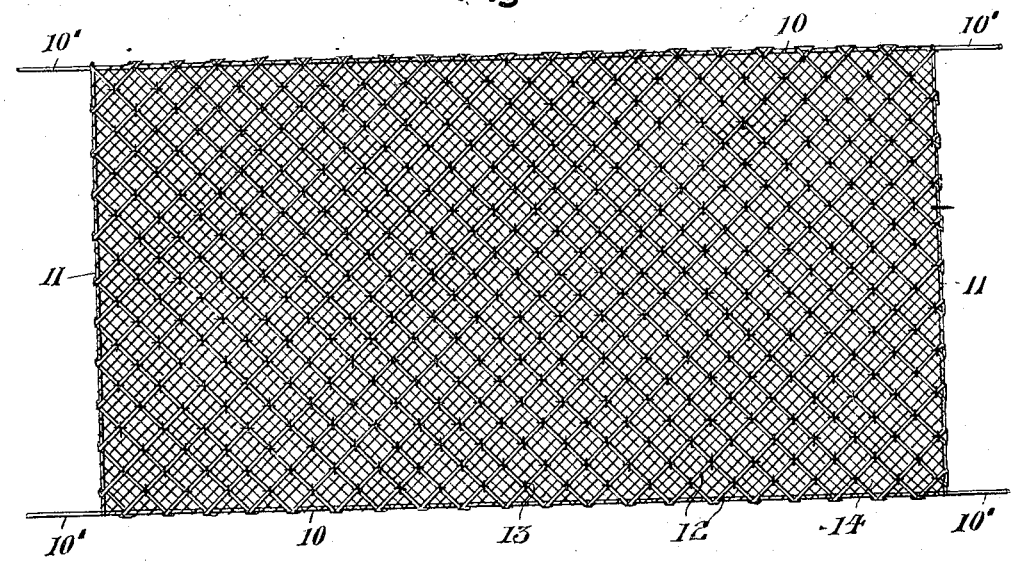
Fig. 2.
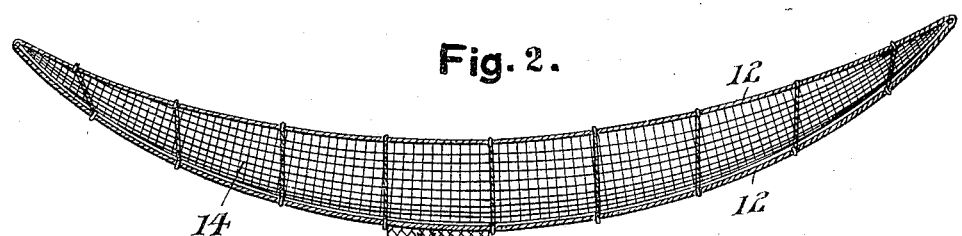
Fig. 3.
Fig. 4.
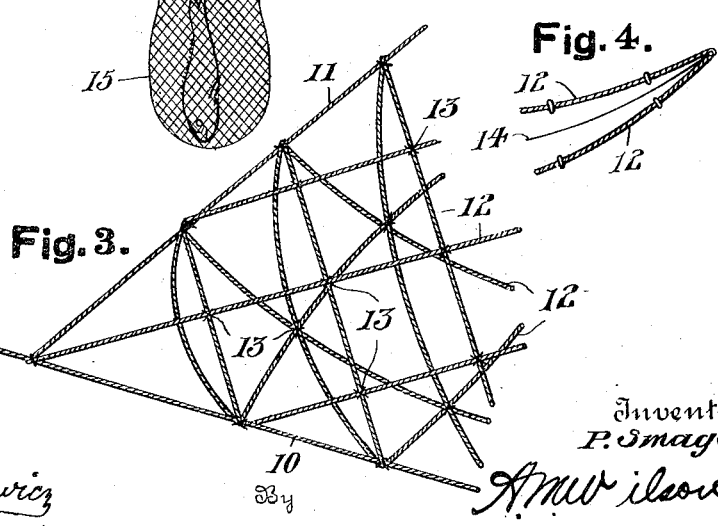
Witnesses
S. Z. Toroskiewicz
W. E. Lowry
Inventor
P. Smagel
By A. W. Wilson
Attorney

UNITED STATES PATENT OFFICE.

PITER SMAGEL, OF AVOCA, PENNSYLVANIA.

FISH SEINE OR NET.

1,128,376.     Specification of Letters Patent.     Patented Feb. 16, 1915.

Application filed September 17, 1914. Serial No. 862,207.

*To all whom it may concern:*

Be it known that I, PITER SMAGEL, a subject of the Czar of Russia, residing at Avoca, in the county of Luzerne and State of Pennsylvania, have invented certain new and useful Improvements in Fish Seines or Nets, of which the following is a specification.

This invention relates to certain new and useful improvements in fish seines or nets.

The object of the present invention is to provide a fish seine embodying a net structure formed of a plurality of sections, and in which a fish may be caught and held by entrance at either side thereof.

A further object of the invention is to provide a seine that normally assumes a flat position and formed of sections which will readily be formed into fish-retaining bags by entrance at either side thereof.

With the above general objects in view and others that will appear as the nature of the invention is better understood, the same consists in the novel construction, combination and arrangement of parts to be hereinafter more fully described, and then claimed.

In the drawing forming a part of this application and to which like designating characters refer to corresponding parts throughout the several views:—Figure 1 is a top plan view of the seine. Fig. 2 is a longitudinal sectional view of the same with the middle section projected to form a fish pocket. Fig. 3 is an enlarged detail view of a portion of the seine, illustrating the connection of the cords, and Fig. 4 is a detail sectional view of a portion of the seine, showing the outer sections and middle net section.

Briefly described, the invention embodies the seine formed of a pair of cord sections secured together in any suitable manner at their peripheral edges, and carrying at each corner thereof a tie rope by which the seine may be secured to a pile or other suitable support in the water. A net is arranged between the cord sections and connected thereto at its peripheral edge, and is adapted to be projected laterally through openings in the cord sections to form pockets in which are retained the fish entering the said openings. These pockets may be projected from either side of the cord sections so that fish on each side of the seine may be readily caught.

Referring more in detail to the accompanying drawing, the reference numeral 10 designates the longitudinal side cords projecting beyond the end cords 11 as at 10', and by which the seine may be secured to posts or other suitable supports.

The outer sections of the seine are formed of strands of cord or other material as indicated at 12 particularly adapted for the same, and are arranged to cross each other as at 13, and be tied in such position in any suitable manner. The outer cord sections 12 are connected together at their peripheral edges, and to the side and end cords 10 and 11 to provide a space between the seine as indicated in Fig. 2. A net section 14 is arranged between the two cord sections and is connected thereto at its peripheral edge in any suitable manner and covers the entire space between said cord sections.

In operation the seine is positioned vertically in the water by having the end cord extensions 10' secured to its post. The cords 12 forming the side sections provide pockets or openings of suitable size, and into which a fish may swim. When a fish enters the opening and comes in contact with the net 14, the said net projects laterally of the cord sections 12 to provide a pocket-like receptacle 15 in which the fish is caught and retained. Entrance may be had at either side of the seine, and the pockets 15 may project from each side.

While I have shown and described the preferred embodiment of the present invention, I do not wish to confine myself to the exact details of construction shown, as various forms, modifications, and arrangement of parts as shown may be resorted to without departing from the spirit and scope of the invention as claimed.

What I claim is:—

1. In a fish seine, a pair of outer netted cord sections secured together at their peripheral edges, a net section of finer mesh arranged between the netted cord sections and adapted to be projected through the meshes of the outer cord sections to provide fish-retaining pockets.

2. In a device of the class described, a pair of netted cord sections and a net of finer mesh arranged between the netted cord sections, and adapted to be projected laterally through the meshes of the netted cord sections to provide fish-retaining pouches.

3. In a device of the class described, a pair of netted cord sections, the strands of which are arranged to provide openings, and a net of finer mesh between the netted cord sections, adapted to be projected through said openings by an entering fish to form a retaining pocket.

In testimony whereof I affix my signature in presence of two witnesses.

PITER SMAGEL.

Witnesses:
P. A. SAMMON,
EDWARD A. NOLAN.